(12) United States Patent
D'Amour et al.

(10) Patent No.: US 8,844,090 B2
(45) Date of Patent: Sep. 30, 2014

(54) TOOL FOR FILLING VOIDS IN TURBINE VANES AND OTHER ARTICLES

(75) Inventors: Brian E. D'Amour, Andover, CT (US); Raymond D. Thurston, Wallingford, CT (US)

(73) Assignee: United Technologies Corporation, Hartford, CT (US)

( * ) Notice: Subject to any disclaimer, the term of this patent is extended or adjusted under 35 U.S.C. 154(b) by 2876 days.

(21) Appl. No.: 11/155,193

(22) Filed: Jun. 17, 2005

(65) Prior Publication Data
US 2007/0003690 A1  Jan. 4, 2007

(51) Int. Cl.
B05C 17/10 (2006.01)
B23P 6/00 (2006.01)
F01D 5/00 (2006.01)

(52) U.S. Cl.
CPC ............ F01D 5/005 (2013.01); F05D 2230/30 (2013.01); B23P 2700/06 (2013.01); B23P 6/007 (2013.01); F05D 2230/90 (2013.01); F05D 2230/20 (2013.01); F05D 2260/202 (2013.01)
USPC ................... 15/244.1; 15/104.001; 15/244.4; 15/245.1; 118/264; 401/10; 401/11; 425/458; 427/287; 427/429

(58) Field of Classification Search
USPC ........... 15/104.001, 210.1, 214, 220.3, 235.4, 15/235.6, 244.1, 244.4, 245.1; 118/264; 401/9–11; 425/458; 427/287, 429
See application file for complete search history.

(56) References Cited

U.S. PATENT DOCUMENTS

| | | | |
|---|---|---|---|
| 3,041,685 A | 7/1962 | Taccone | |
| 3,205,527 A * | 9/1965 | Laird | 15/244.1 |
| 3,226,245 A | 12/1965 | Dettling et al. | |
| 3,445,880 A | 5/1969 | Warner | |
| 3,487,530 A | 1/1970 | Ely | |
| 3,934,300 A * | 1/1976 | Tortorello | 15/244.1 |
| 3,964,666 A | 6/1976 | Dinella et al. | |
| 3,989,087 A | 11/1976 | McCormack | |
| 4,042,162 A | 8/1977 | Meginnis et al. | |
| 4,050,133 A | 9/1977 | Cretella et al. | |
| 4,224,494 A | 9/1980 | Reboux et al. | |
| 4,517,702 A * | 5/1985 | Jackson | 15/114 |
| 4,601,081 A * | 7/1986 | Sutton et al. | 15/104.94 |
| 4,866,828 A | 9/1989 | Fraser | |
| 5,116,151 A * | 5/1992 | Lytton et al. | 401/9 |
| 5,448,828 A | 9/1995 | Willems et al. | |

(Continued)

FOREIGN PATENT DOCUMENTS

DE  102 06 447 A1  8/2003
EP  0 269 551 A  6/1988

(Continued)

Primary Examiner — Mark Spisich
(74) Attorney, Agent, or Firm — Bachman & LaPointe, P.C.

(57) ABSTRACT

A tool 54 for introducing a paste 74 into voids 44 in an article 12 includes at least one pad having a working surface shaped similarly to the shape of a target region on the article. In one specific embodiment, the tool 54 has first and second pads 56, 60, joined to each other by, for example, a hinge 66. The pads and hinge are engageable with the article 12 so that each similarly shaped working surface 58, 62, 68 hugs a corresponding target region on the article to urge the paste into the voids. An associated method of concurrently filling voids in an article includes applying a filler material to the article in the vicinity of the voids and urging the filler material concurrently into the multiple voids.

17 Claims, 5 Drawing Sheets

(56) References Cited

U.S. PATENT DOCUMENTS

| | | |
|---|---|---|
| 5,565,035 A | 10/1996 | Sylvestro et al. |
| 5,701,669 A | 12/1997 | Meier |
| 5,873,703 A | 2/1999 | Kelly et al. |
| 5,896,616 A * | 4/1999 | Large .................... 15/244.1 |
| 6,258,226 B1 | 7/2001 | Conner |
| 6,273,676 B1 | 8/2001 | Brooks et al. |
| 6,283,356 B1 | 9/2001 | Messelling |
| 6,454,156 B1 | 9/2002 | Taras, Jr. et al. |
| 6,470,568 B2 | 10/2002 | Fried et al. |
| 6,615,470 B2 | 9/2003 | Corderman et al. |
| 6,626,350 B2 | 9/2003 | Meier |
| 6,883,988 B1 * | 4/2005 | Brown et al. .................... 401/10 |
| 7,917,988 B2 * | 4/2011 | Gillott et al. ................. 15/244.1 |
| 2003/0037436 A1 | 2/2003 | Ducotey, Jr. et al. |
| 2004/0226577 A1 * | 11/2004 | Schaaf ............................ 134/6 |
| 2005/0108840 A1 * | 5/2005 | Marshall .................... 15/104.94 |
| 2005/0172434 A1 * | 8/2005 | Logan, Sr. ..................... 15/114 |
| 2006/0123577 A1 * | 6/2006 | Luster .......................... 15/210.1 |

FOREIGN PATENT DOCUMENTS

| | | |
|---|---|---|
| EP | 0 843 026 A | 5/1998 |
| EP | 0 965 390 A | 12/1999 |
| EP | 1 055 480 A | 11/2000 |
| EP | 1 077 126 A | 2/2001 |
| EP | 1 256 635 A | 11/2002 |
| GB | 2 354 962 A | 4/2001 |
| GB | 2354962 | 4/2001 |
| JP | 56140696 A | 11/1981 |
| JP | 2001115857 A | 4/2001 |
| JP | 2002164649 A | 6/2002 |
| WO | 2005045199 * | 5/2005 |

* cited by examiner

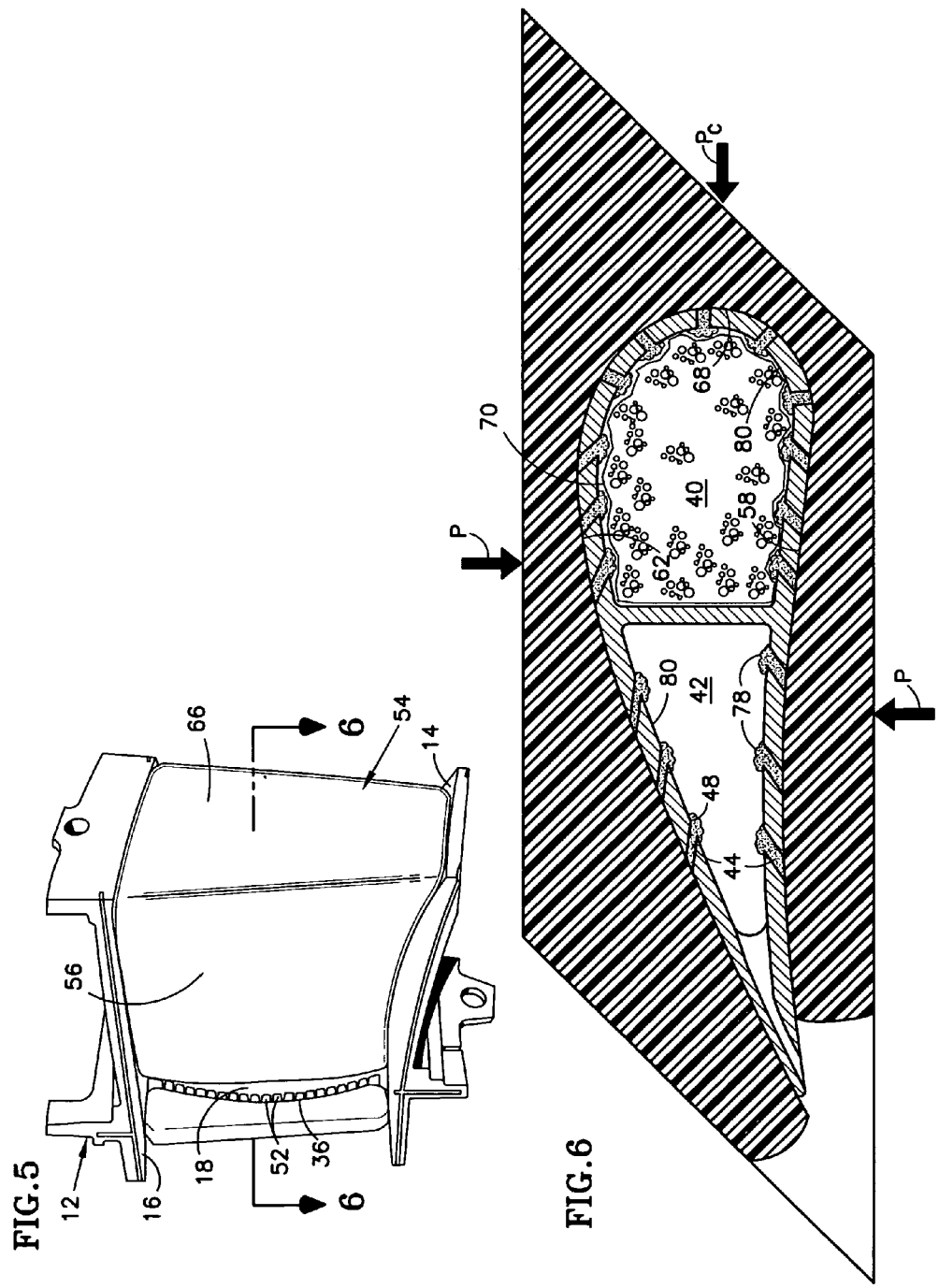

TOOL FOR FILLING VOIDS IN TURBINE VANES AND OTHER ARTICLES

TECHNICAL FIELD

This invention relates to a tool and an associated method for introducing an alloy paste concurrently into numerous voids in an article.

BACKGROUND OF THE INVENTION

Gas turbine engines include a turbine module for extracting energy from a stream of hot, gaseous combustion products that flow through a working medium flowpath. A typical turbine module includes at least one rotor disk with an array of circumferentially distributed blades secured to the disk. Each blade has an airfoil that spans radially across the flowpath. The turbine module also includes one or more arrays of circumferentially distributed vanes axially offset from the blades. Each vane also includes an airfoil that spans radially across the flowpath.

Because the blades and vanes are exposed to the hot combustion gases, it is common practice to make them of temperature tolerant alloys such as nickel or cobalt base alloys. Despite the temperature tolerance of the alloys, it is also common practice to protect the blades and vanes from thermally induced damage. One means of protection is to apply a thermal barrier coating to those blade and vane surfaces, such as the airfoils, that are exposed to the hot gases. Another means is to cool the blades and vanes with a coolant, which is usually relatively cool, pressurized air extracted from an engine compressor. In a cooled blade or vane, the airfoil includes one or more internal cavities that receive the coolant. A multitude of coolant holes penetrates the walls of the airfoil to permit fluid communication from the internal cavity to the flowpath exposed surface. During engine operation, coolant flows into the cavity which then distributes the coolant to the holes. The coolant then flows through the holes to cool the airfoil. The coolant discharged from the holes spreads out to form a thin film of coolant on the airfoil surfaces, thus further protecting the airfoil.

Frequently, engine designers use both thermal barrier coatings and air cooling in combination. During manufacture, the coating is first applied to the substrate-alloy of the blade or vane, and then the coolant holes are installed so that they penetrate through both the coating and the airfoil wall. The holes may be installed by any suitable technique such as laser drilling, electron beam drilling or electro-discharge machining, although the holes are often referred to as "drilled" holes irrespective of the actual technique used to install them. In referring to the holes, we use the term "flowpath side opening" to refer to the hole opening at the flowpath side of the airfoil wall and "cavity side opening" to refer to the hole opening at the airfoil internal cavity.

Despite the efforts to guard against thermal damage, the blades and vanes nevertheless suffer such damage during engine operation and must periodically be repaired or refurbished. A typical repair involves stripping the thermal barrier coating, repairing any damage to the substrate alloy, and subsequently re-applying a replacement thermal barrier coating. This presents a difficulty because the coolant holes are already present in the airfoil walls. If the thermal coating were to be applied over these existing holes, it would then be necessary to install corresponding holes through the newly applied coating. These newly installed holes through the coating would have to be precisely aligned with the existing holes in the substrate alloy. However achieving such alignment is exceedingly difficult. Accordingly, standard practice is to completely plug the existing holes in the substrate with a suitable filler alloy prior to applying the replacement coating. This essentially restores the airfoil walls to their pre-drilled state. The replacement coating can then be applied, and new holes can be installed through both the replacement coating and the restored airfoil walls.

The step of plugging the holes involves introducing a suitable alloy paste into the holes and then thermally processing the blade or vane so that the alloy paste solidifies in the holes. A suitable alloy paste has a metallurgical composition compatible with that of the parent alloy so that it forms a secure bond with the parent alloy and can withstand the rigors of service in an engine. To ensure a high quality repair, it is necessary to completely plug the holes in the substrate. That is, the entire volume of each hole must be completely filled with the alloy paste in order to replicate the pre-drilled state of the airfoil walls. The repair paste does not readily flow into the holes and therefore must be forced into the holes. This is typically done with a paste injection system that includes a reservoir of paste, a hollow injection needle that receives the paste from the reservoir and dispenses it into the holes, and a source of pressurized air for forcing the paste through the needle. A technician inserts the dispensing end of the needle into the flowpath side opening of a hole and operates a foot pedal to apply the air pressure to the paste. The pressurization causes the paste to completely fill the hole until it oozes out the cavity side opening of the hole. The technician then repeats this process for each and every hole to be plugged. After all the holes are filled, the paste is allowed to partially dry and stiffen, which leaves a small spur of semi-hardened paste projecting past the cavity side opening of each hole. The technician then uses a small spatula to reach into the cavity and chip off the spurs. Finally, the blade or vane is thermally processed to solidify the paste and bond the solidified alloy to the parent alloy.

The above described plugging process results in a successful repair, but suffers from certain disadvantages. Because the holes are numerous (one vane repaired by the assignee of this application has more than 450 holes) and because the hole diameters are tiny (on the order of 0.040 inches or about 1 millimeter) the technician's job is repetitive and tedious. The repetitive nature of the process makes it ergonomically suboptimal. The tedious nature of the work can lead to mistakes such as incompletely filled holes or holes that are overlooked entirely. Finally, the work is time consuming both because of the large number of holes and also because of the inspections required to identify any hole filling errors or oversights. Nevertheless, the above described filling technique has been thought to be the only way to reliably fill the entire volume of a typical, small diameter coolant hole.

What is needed is a quicker, more satisfactory way to plug multiple holes.

SUMMARY OF THE INVENTION

A tool for introducing a paste into voids in an article includes a pad having a surface shaped similarly to the shape of the region of the article that contains the voids.

A specific example of the tool includes a first pad and a second pad, at least one of which has a surface shaped similarly to the shape of the region of the article containing the voids. The pads are joined to each other and are engageable with the article so that the similarly shaped surface hugs the void-containing region of the article to urge the paste into the voids.

An associated method of filling multiple voids in an article includes applying a filler material to the article in the vicinity of the voids and urging the filler material concurrently into the multiple voids.

The foregoing and other features of the various embodiments of the tool and method will become more apparent from the following description of the best mode for carrying out the invention and the accompanying drawings.

BRIEF DESCRIPTION OF THE DRAWINGS

FIG. 5 shows the vane of FIG. 1 and the tool of FIG. 3 engaging the airfoil portion of the vane.

FIG. 6 is a cross sectional view taken in the direction 6-6 of FIG. 5.

BEST MODE FOR CARRYING OUT THE INVENTION

Figure 1:
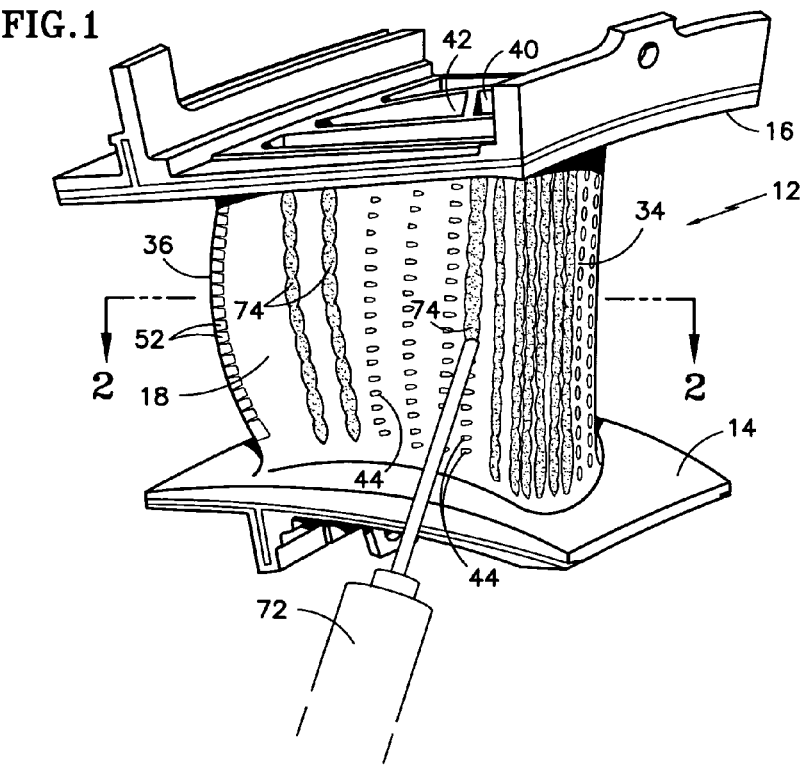
FIG. 1 shows a turbine vane for a gas turbine engine including multiple rows of coolant holes and an alloy paste overlying some of the holes.
Figure 2:
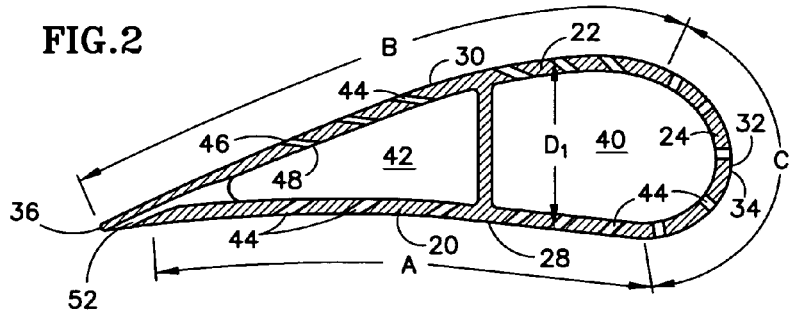
FIG. 2 is a cross sectional view taken in the direction 2-2 of FIG. 1 showing the airfoil portion of the vane.

FIGS. 1 and 2 illustrate a vane 12 for the turbine module of a gas turbine engine. The vane includes radially inner and outer platforms 14, 16 and an airfoil 18. When installed in an engine, the platforms 14, 16 cooperate with the platforms of circumferentially neighboring vanes to define the radially inner and outer boundaries of an annular working medium flowpath, and each airfoil spans radially across the flowpath.

The airfoil has a concave pressure wall 20, a convex suction wall 22 and a leading edge wall 24, each with corresponding external surfaces 28, 30, 32. The surfaces 28, 30, 32 collectively define the external surface of the airfoil. The pressure and suction walls extend chordwisely from an airfoil leading edge 34 to a trailing edge 36. The pressure and suction surfaces 28, 30 are spaced from each other by a chordwisely varying separation distance $D_1$. The airfoil walls bound forward and aft internal cavities 40, 42 for receiving coolant.

Numerous coolant holes, such as 44, penetrate the pressure wall, the suction wall and the leading edge wall. These holes are present along the pressure surface, 28 the suction surface 30 and the leading edge surface 32 and represent voids that are required to be filled with an alloy paste. The holes extend from a first or flowpath side opening 46 at the flowpath or external side of the airfoil wall and second or cavity side opening 48 at one of the airfoil internal cavities 40, 42. Other voids, such as small cracks, might also be present on the vane.

Coolant windows 52 reside along the pressure side near the trailing edge to help exhaust coolant from the aft cavity 42. In the illustrated vane, the coolant windows 52 do not require plugging. Accordingly, the illustrated vane has three target regions populated by coolant holes that require plugging: target region A on the pressure surface, target region B on the suction surface and target region C on the leading edge surface.

Figure 3:
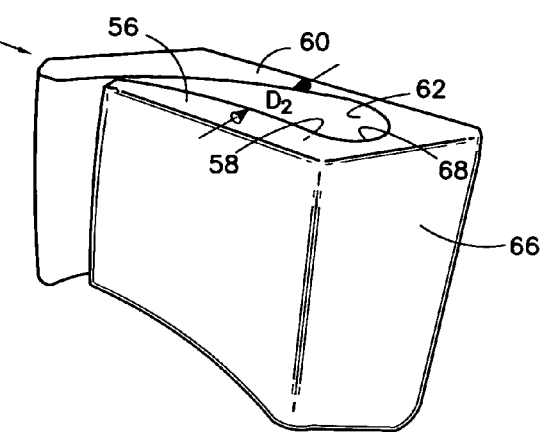
FIG. 3 shows one variant of a tool for forcing the alloy paste concurrently into the numerous holes of FIG. 1, the tool being illustrated in a relaxed state.

FIG. 3 illustrates a tool 54 that facilitates the introduction of an alloy paste concurrently into voids such as the numerous coolant holes 44. The tool comprises a first pad 56 whose interior surface 58 is a working surface shaped substantially similarly to the surface shape of target region A. Since target region A is on the airfoil pressure surface, the pad 56 is referred to as a pressure surface pad. The tool also comprises a second pad 60 whose interior surface 62 is a working surface shaped substantially similarly to the surface shape of target region B. Since target region B is on the airfoil suction surface, the pad 60 is referred to as a suction surface pad. The pads are joined to each other by a joint, for example a hinge 66. The hinge 66 is also a pad whose interior surface 68 is a working surface shaped similarly to the surface shape of target region C.

As seen in FIG. 3, when the tool is not in use, it takes on a relaxed state in which the non-hinged end of the suction pad and the non-hinged end of the pressure pad lightly touch each other and the pads are spaced from each other by a chordwisely varying distance $D_2$ smaller than the separation distance $D_1$ between the airfoil suction and pressure surfaces. The pads are also displaceable relative to each other so that they can be positioned in both a disengaged position and an engaged position relative to the airfoil. In the disengaged position (FIG. 4), the pads are spread apart so that the airfoil can be slipped into the opening between the pads. In the engaged position (FIGS. 5 and 6) the pad interior surfaces 58, 62, 68 each hug the corresponding target regions A, B, C of the airfoil surface.

The illustrated tool is monolithic in that it is a seamless, single piece unit molded of a single material. The pad material is flexible enough to substantially conform to the surface shape of the target regions, A, B, C, but stiff enough to urge an alloy paste into the holes as described below. One material known to be satisfactory is a room temperature vulcanizing (RTV) silicone rubber supplied by GE Silicones and referred to as RTV 668. The RTV 668 material has a Durometer hardness of between about 55 and 62 on the Shore A scale.

The use of the tool is best understood by referring to FIGS. 1, 4, 5 and 6. A technician first positions an absorbent material, for example a foam rubber sponge 70, into each of the cavities 40, 42 (in FIG. 6, the sponge is illustrated in only the forward cavity). The technician then applies a filler material to the airfoil surface in the vicinity of the coolant holes. Specifically, the technician uses a syringe assembly 72 (FIG. 1) to apply a bead of relatively high melting point alloy paste 74 over each of the several rows of coolant holes. This differs from the prior practice, in which the paste was forced, under pressure, into each and every hole, one hole at a time.

Figure 4:
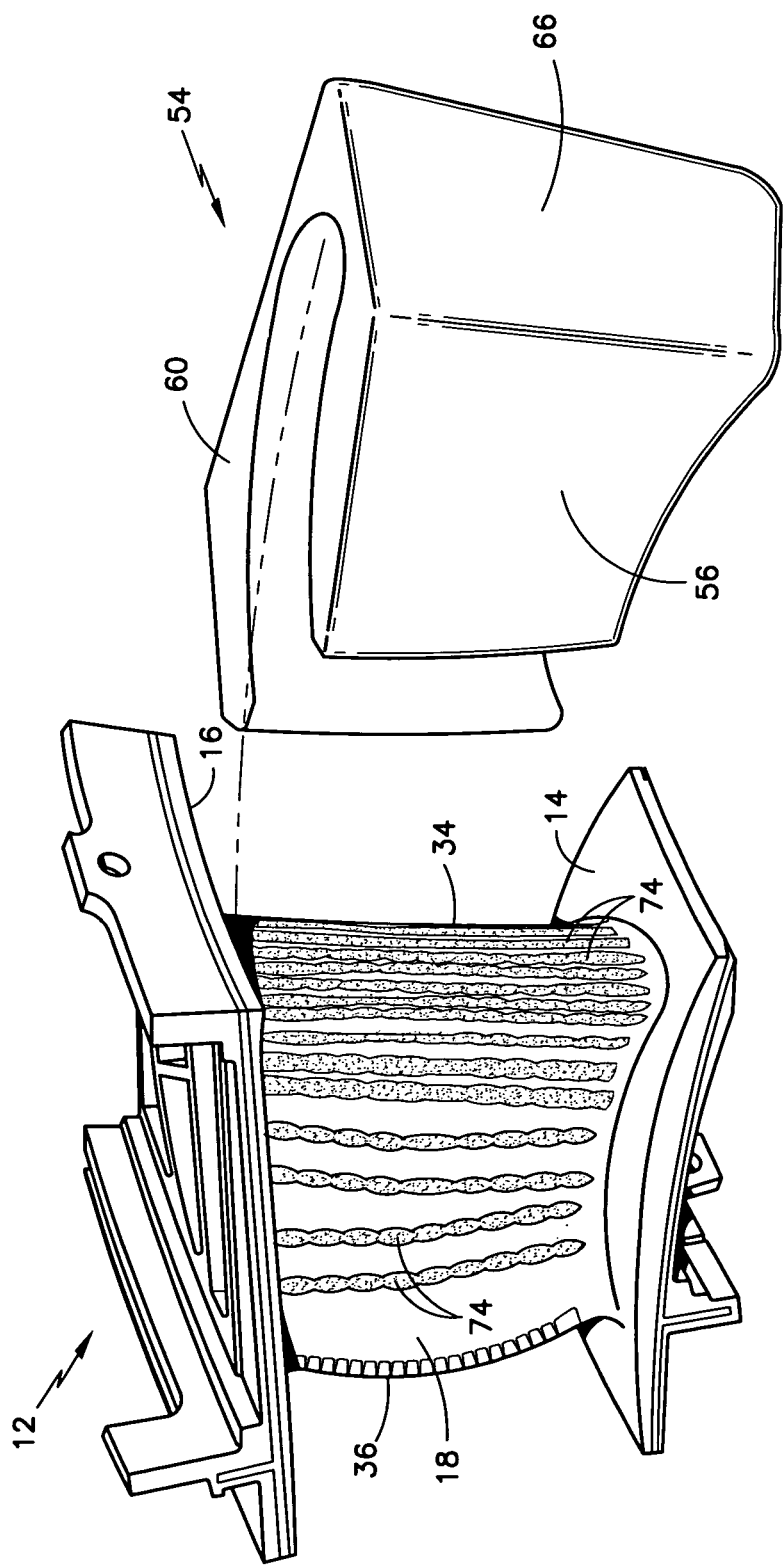
FIG. 4 shows the vane of FIG. 1 with alloy paste applied to all the coolant holes and also shows the tool of FIG. 3 in a disengaged state so that the airfoil portion of the vane can be slipped into an opening in the tool.

The technician then uses the tool 54 to urge the paste concurrently into the holes 44. To use the tool, the technician spreads apart the pads and slips the airfoil into the opening between the pads as seen in FIG. 4. The technician then allows the pads to close onto the airfoil external surface as seen in FIGS. 5 and 6. Because the pads do not close to their relaxed state of FIG. 3, they exert a slight pressure on the beads of alloy paste to help force the paste into the holes. The technician manually applies additional pressure to the pressure surface pad and the suction surface pad. The pressure P exerted on the pads, and therefore on the target regions A, B, C, concurrently urges the alloy paste into the holes so that the paste fills the volume of each hole and excess paste 78 (FIG. 6) oozes out the cavity side openings of the holes. The sponge 70 at least partially absorbs the excess paste. An approximately chordwise component $P_c$ of the pressure P ensures that the working surface 68 of the hinge pad 66 hugs the leading edge surface 32 to reliably force the paste to completely fill the leading edge holes, even though these leading edge holes are significantly angularly offset from the direction of the pressure P.

The technician then withdraws the sponges 70 from the cavities 40, 42 and uses a cotton swab to wipe any residual paste off the cavity perimeter surface 80. The use of the sponges and swab removes most of the excess paste. However a small amount of excess paste may still project beyond the cavity side openings 48 of one or more holes. This paste is allowed to partially dry and stiffen resulting in small spurs of semi-hardened paste that project into the cavity. The technician uses a spatula to chip off any of these spurs that are unacceptably large. The technician also disengages the tool 54 from the vane. The disengagement usually pulls a small amount of paste out of the flowpath side openings of the holes, leaving visually discernible shallow depressions. A second bead of alloy paste having a lower melting point than the paste in the holes is then applied over each row of holes. This second paste is not pressed into the holes, but nevertheless fills the shallow depressions. The vane is then thermally processed as already described to plug the holes. The processing also solidifies the second bead of paste. The hardened bead is machined off the airfoil to restore the airfoil external surface to its required aerodynamic shape.

The above described tool and method have been shown to be unexpectedly capable of completely filling the holes. Previously, such complete filling was thought possible only by using the tedious hole-by-hole approach. Moreover, the described tool and method are considerably more time efficient than the prior practice. For example, one type of turbine vane repaired by the assignee of the present invention has more than 450 coolant holes. A technician normally requires about 45 minutes to fill these holes with alloy paste using the injection needle. By contrast, these holes can be filled in only about 5 minutes using the above described tool and method. In addition, the procedure is more satisfactory from an ergonomic standpoint and, because it is less tedious, is less likely to result in hole filling errors.

Certain additional features and attributes of the invention can now be more readily appreciated. The illustrated vane has been described as including three target regions: A, B and C. This designation of target regions conforms to the conventional view in which the airfoil has an undifferentiated external surface which is thought of as comprising a pressure surface 28, a suction surface 30 and a leading edge surface 32. However, the target regions in the illustrated airfoil could have been described as a single continuous target region. In other articles, the target regions might be more distinct from each other. In addition, if there were no holes to be filled in one of the regions A, B, C, the corresponding tool surface would not necessarily need to mimic the shape of that region. However, there are at least two reasons why it is nevertheless advisable to make that tool surface similar to the corresponding region of the airfoil surface. First, a completely conformal tool would be expected to work better. Second, because the tool is made by molding the RTV 668 material around a representative airfoil shape, it is easier to mimic the entire airfoil shape than not to.

The illustrated joint between pads 56 and 60 is a hinge that allows the pads to each rotate through an angle. However the joint between the pads may take other forms, such as one that allows the pads to translate toward or away from each other with little or no relative angular displacement, or that permits both translation and angular displacement.

Figure 7:
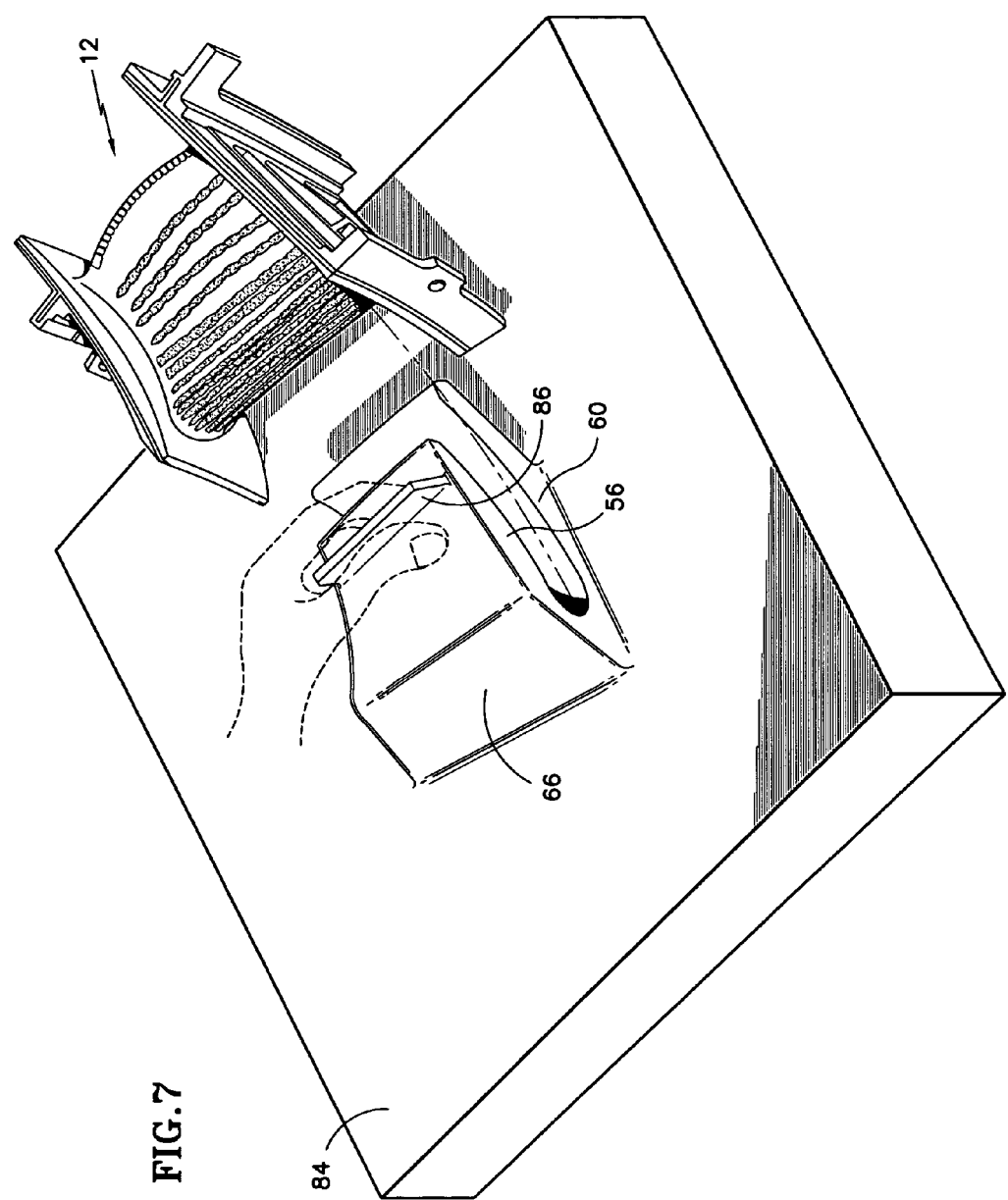
FIG. 7 shows a variant of the tool that includes a base and a handle.

FIG. 7 shows a variant of the tool that includes a base 84 and a handle 86. The suction surface pad 60 is secured to the base 84. The base is heavy enough to anchor the tool so that the technician need not hold onto the tool while spreading the pads apart. Alternatively, the base can be mounted to a workbench by fasteners or other means. The handle 86 extends from the pressure surface pad 56. The handle permits a technician to more easily spread the pads away from each other and insert the vane. The pad 60 may be permanently mounted on the base or may be removably mounted so that the pad can be easily removed and cleaned.

Figure 8:
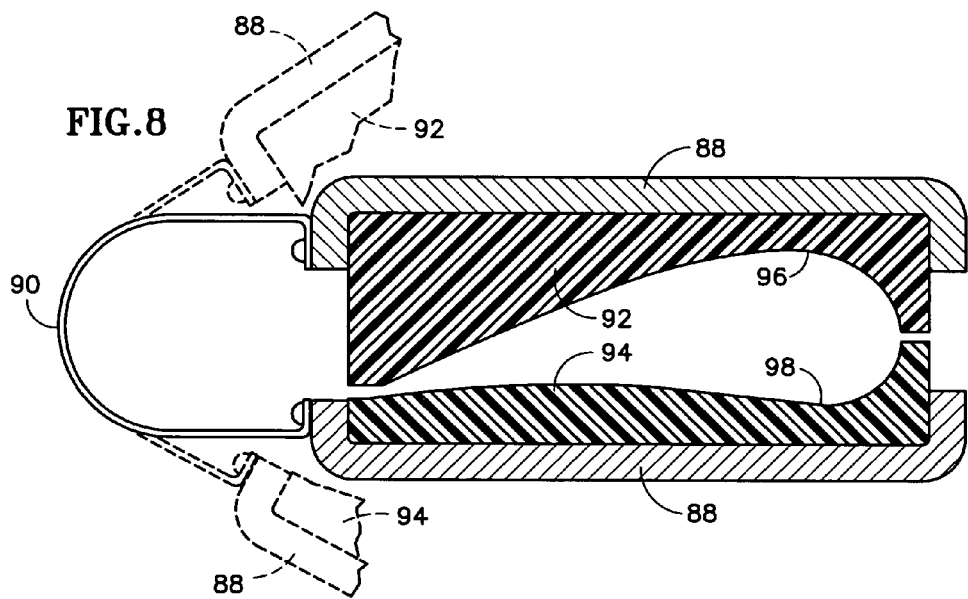
FIG. 8 shows another embodiment of the tool.

The illustrated tool has been described as a seamless, single piece unit molded of a single material. However other variants may also be satisfactory. For example, FIG. 8 shows a possible variant of the tool. The variant includes two rigid frame elements 88 connected to each other by a leaf spring 90. Pads 92, 94 with working surfaces 96, 98 shaped similarly to the shape of a target region are mounted on the frame elements.

Figure 9:
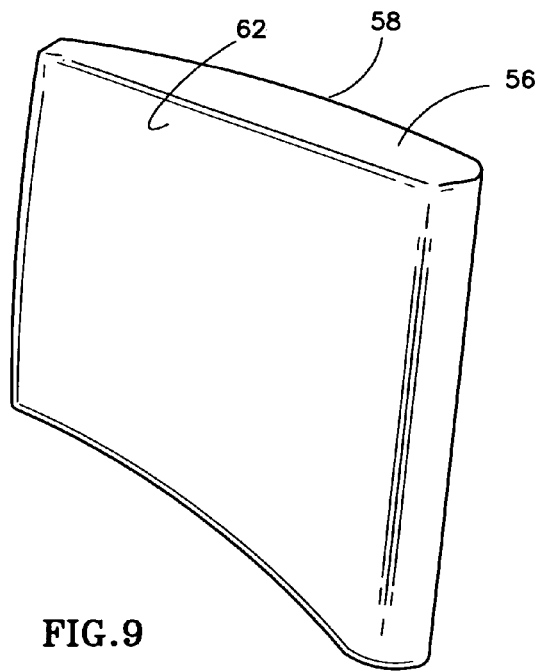
FIG. 9 shows yet another embodiment of the tool.

The tool has been described as having multiple pads. However it may have only a single pad. For example, if it is necessary to introduce the alloy paste only into holes on the suction side of an airfoil, a simple single pad tool as seen in FIG. 9 could be effective. Moreover, the tool shown in FIGS. 3-6 could be viewed as a single pad tool if the target regions A, B and C are defined to be a single target region.

The tool and method have been described in the context of a turbine vane, however both the tool and method are also clearly applicable to other articles, as including turbine blades.

Although the tool and method have been shown and described with reference to a specific embodiments thereof, it will be understood by those skilled in the art that various changes in form and detail may be made without departing from the invention as set forth in the accompanying claims.

We claim:

1. A tool for introducing a paste into voids in an article, the voids being accessible from a surface of the article and residing in a target region of the surface, the tool comprising:
   at least one pad having a working surface shaped similarly to the shape of the target region and;
   at least a portion of the tool is configured to engage the article at the target region, where the article is a gas turbine engine blade or vane having an airfoil, with a suction surface, a pressure surface and a leading edge connecting the suction surface to the pressure surface, and wherein the at least one pad has a first working surface shaped similarly to a suction surface target region and a second working surface shaped similarly to a pressure surface target region.

2. The tool of claim 1 comprising a first pad and a second pad, the pads being joined to each other and engageable with the article so that each similarly shaped working surface hugs the corresponding target region to urge the paste into the voids.

3. The tool of claim 2 wherein the pads are joined to each other by a hinge.

4. The tool of claim 3 wherein the pads and the joint form a monolithic unit.

5. The tool of claim 2 wherein the suction surface and pressure surface are spaced from each other by a separation distance and the tool has a relaxed state in which the pads are spaced from each other by a distance less than the separation distance.

6. The tool of claim 2 wherein the suction surface pad and pressure surface pad are connected to each other by a hinge that includes a hinge working surface shaped similarly to a target region on the airfoil that urges paste into voids in a leading edge target region of the airfoil.

7. The tool of claim 2 wherein the pads are displaceable relative to each other and positionable in a disengaged position relative to the article and in an engaged position relative to the article, wherein in the engaged position the similarly shaped surfaces hug the corresponding target regions to urge the paste into the voids.

8. The tool of claim 2 wherein the pads are made of a material flexible enough to conform to the surface shape of the target regions and stiff enough to urge the paste into the voids.

9. The tool of claim 8 wherein the pads are made of RTV 668 Silicon Rubber.

10. The tool of claim 8 wherein the pads have a Durometer hardness of between about 55 and 62 on the Shore A scale.

11. The tool of claim 2 wherein one of the pads is secured to a base and the other of the pads includes a handle.

12. The tool of claim 2 wherein the voids are coolant holes that extend from the suction and pressure surfaces to an airfoil internal cavity, and wherein:
    the first pad is a pressure surface pad having a working surface shaped similarly to the airfoil pressure surface;
    the second pad is a suction surface pad having a working surface shaped similarly to the airfoil suction surface, the suction surface pad being joined to the pressure surface pad by a hinge;
    the pads are displaceable relative to each other and positionable in a disengaged position relative to the airfoil and in an engaged position relative to the airfoil;
    wherein in the engaged position the working surfaces hug the suction and pressure surfaces to urge the paste into the voids.

13. The tool of claim 12 wherein leading edge coolant holes extend through the leading edge and wherein in the engaged position a working surface of the hinge hugs the leading edge of the airfoil to urge the paste into the leading edge holes.

14. The tool of claim 1 wherein the voids are holes that penetrate through a wall in the article.

15. The tool of claim 14 wherein the holes are coolant holes.

16. The tool of claim 1 wherein the working surface is an interior surface.

17. The tool of claim 1 wherein the target region is substantially the entire surface of the article and the shaped surface is shaped to conform to that entire surface.

* * * * *